No. 624,899. Patented May 16, 1899.
W. H. BACKUS.
RAKE.
(Application filed Apr. 13, 1898.)

(No Model.)

Witnesses.
Harry L. Hannaford
Matthew J. Dunn

Inventor.
William Henry Backus

UNITED STATES PATENT OFFICE.

WILLIAM HENRY BACKUS, OF DANIELSON, CONNECTICUT.

RAKE.

SPECIFICATION forming part of Letters Patent No. 624,899, dated May 16, 1899.

Application filed April 13, 1898. Serial No. 677,523. (No model.)

*To all whom it may concern:*

Be it known that I, WILLIAM HENRY BACKUS, a citizen of the United States, and a resident of Danielson, in the county of Windham and State of Connecticut, have invented certain new and useful Improvements in Rakes, of which the following is a specification, reference being had to the accompanying drawings, forming a part thereof, in which similar letters of reference indicate corresponding parts.

The object of my invention is to provide an improvement in rakes, more especially the class of lawn and garden rakes designed to prevent the annoyance and delay caused by the clogging of the teeth of the rake when in use. I attain this object by a construction and combination of parts illustrated by the accompanying drawings, of which—

Figure 1:
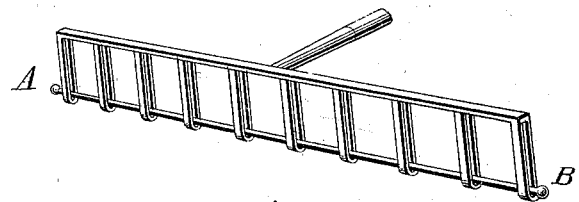
Figure 2:
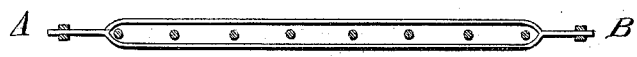

Figure 1 is a perspective view of one form of my improved rake, and Fig. 2 a plan view of a modified form of the same.

The construction of the rake proper embodying my improvement differs from the ordinary construction of such rakes only by having the teeth, comprising the whole series or a limited portion thereof, looped or slotted longitudinally, the axes of said loops or slots lying in a plane substantially coincident with the central plane of the teeth. In combination therewith I provide a cleaner-bar held in loose engagement with the teeth by means of said loops or slots.

In the form shown by Fig. 1 the whole series of teeth are slotted, as described, and the cleaner-bar consists simply of a straight rod held entirely within the slots and having enlarged terminals to prevent its escape by endwise movement. In place of enlarged terminals one or more enlarged portions or shoulders at some intermediate point or points may be substituted to effect the same purpose.

In the form shown in plan by Fig. 2 only the two end teeth of the rake are slotted, and the cleaner-bar is held in the required position by having its ends passed through the slots, while its remaining portion is given the form of an elongated loop loosely embracing the intermediate teeth. One advantage of this form is that the conformation of the bar itself insures the desired limitation of its endwise movement without the need of special provision therefor.

It will be understood that departures from the particular forms of cleaner-bar here shown and described will be properly within the scope of the invention, provided only that the mutual adaptation of parts be preserved, whereby the cleaner-bar is held in loose engagement with the rake-teeth by being passed wholly or in part through longitudinal slots formed in said teeth, giving the bar freedom of movement within limits along the range of the teeth. Furthermore, in making selection of any portion of the teeth less than the whole number to be formed with slots others than the particular teeth shown slotted in Fig. 2 may be selected without thereby departing from the principle of the invention.

In operating my improved rake the cleaner-bar assumes normally by force of gravity a position near the lower or free ends of the teeth, but automatically yields to the pressure of the usual accumulations in raking and is gradually forced toward the rake-head. Whenever the tendency to clog is not extreme, the constant shaking of the bar, due to its loose adjustment, keeps the teeth clear without further attention; but whenever this proves insufficient it is only necessary to give the rake a moderately-sharp downward movement to impart to the bar momentum sufficient to discharge the accumulations instantly and completely under ordinary conditions of use.

What I claim, and desire to secure by Letters Patent, is—

In a rake the combination of teeth, comprising the whole series or a portion of the same, having longitudinal slots, with a cleaner-bar held in loose engagement therewith by means of said slots, said bar being formed with one or more enlarged portions or shoulders adapted to limit its endwise movement, substantially as set forth.

WILLIAM HENRY BACKUS.

Witnesses:
ARTHUR G. BILL,
ANNIE E. LATHROP.